April 16, 1968  O. W. STONE  3,378,137
DISPLAY CARTON

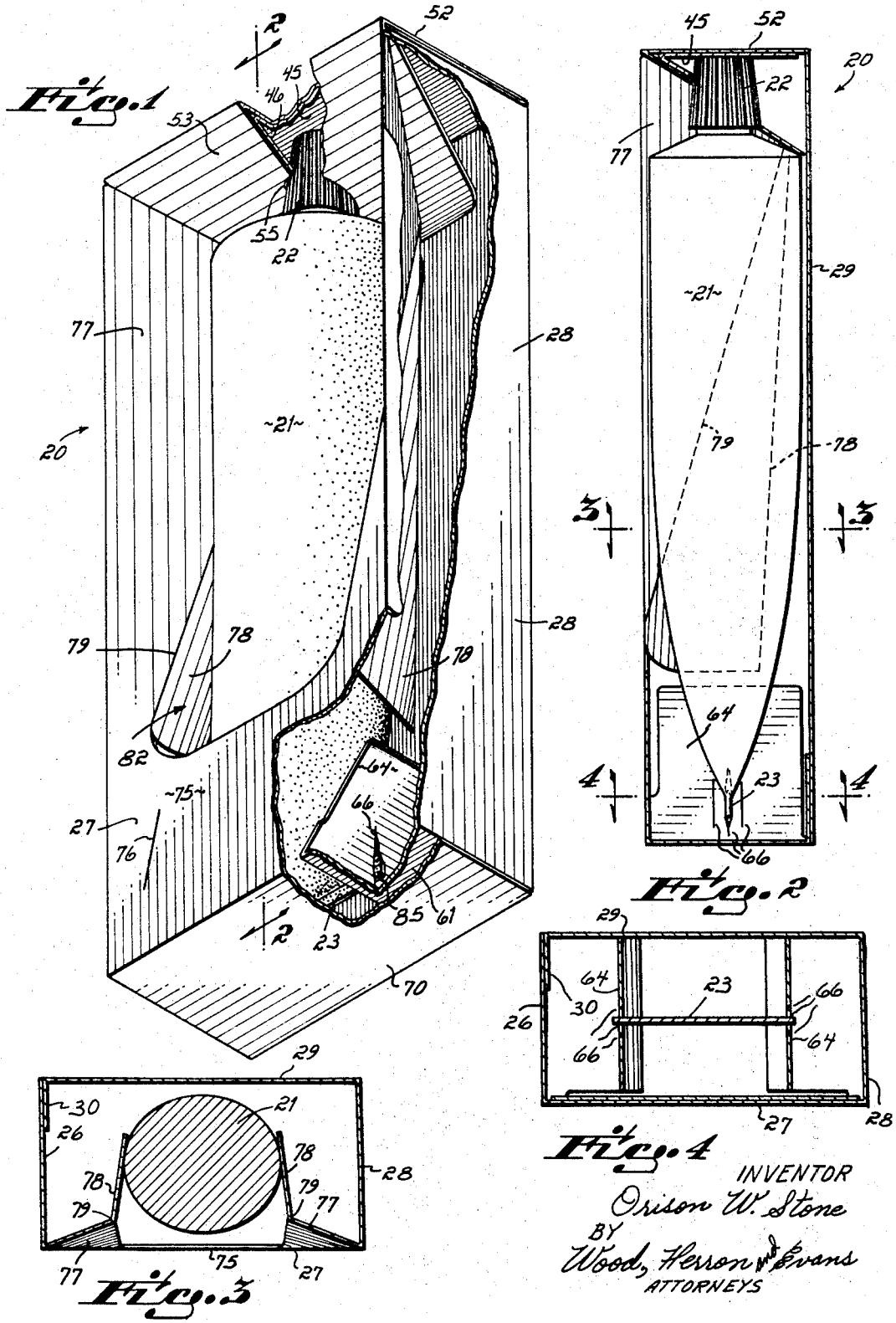

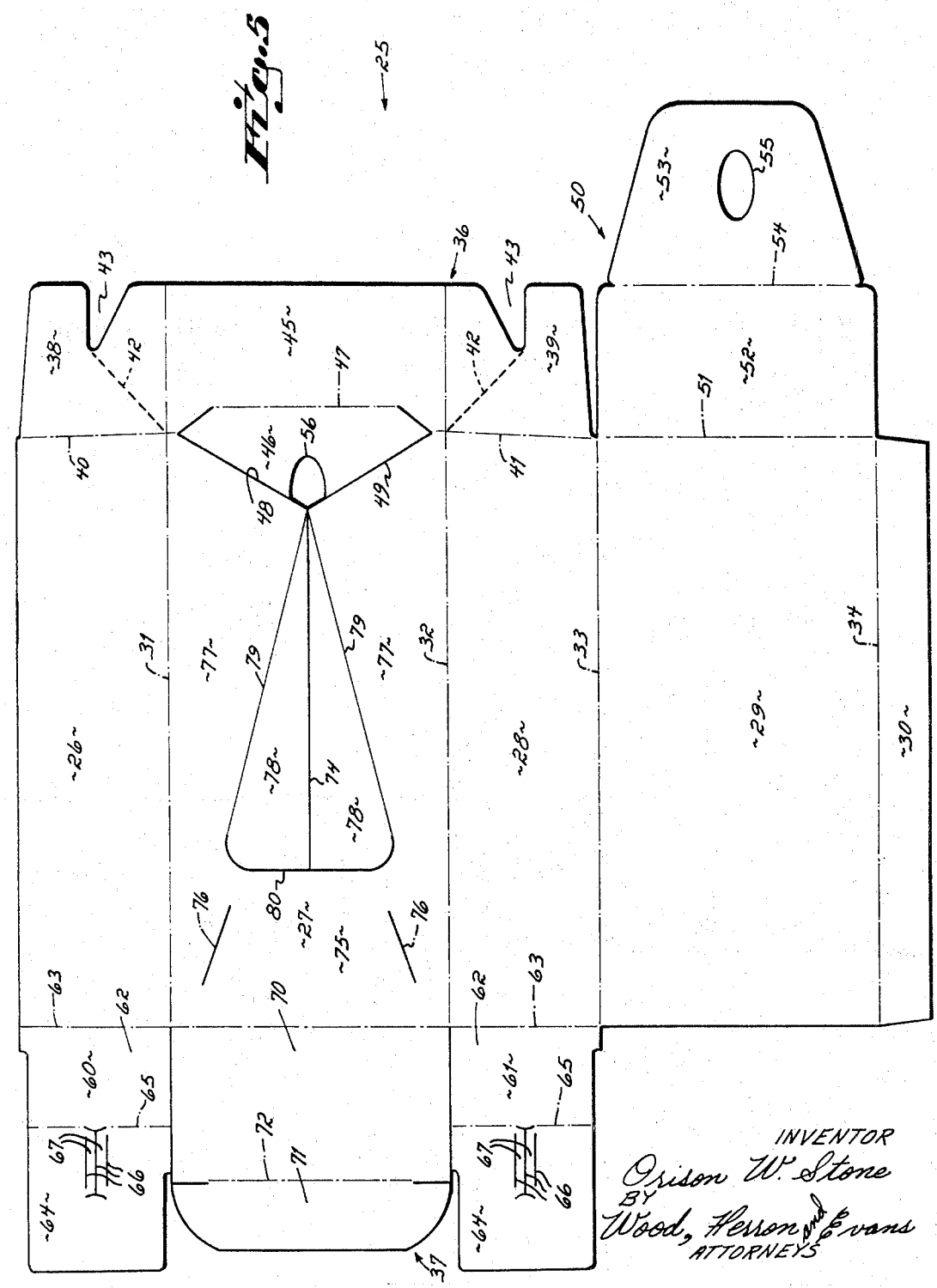

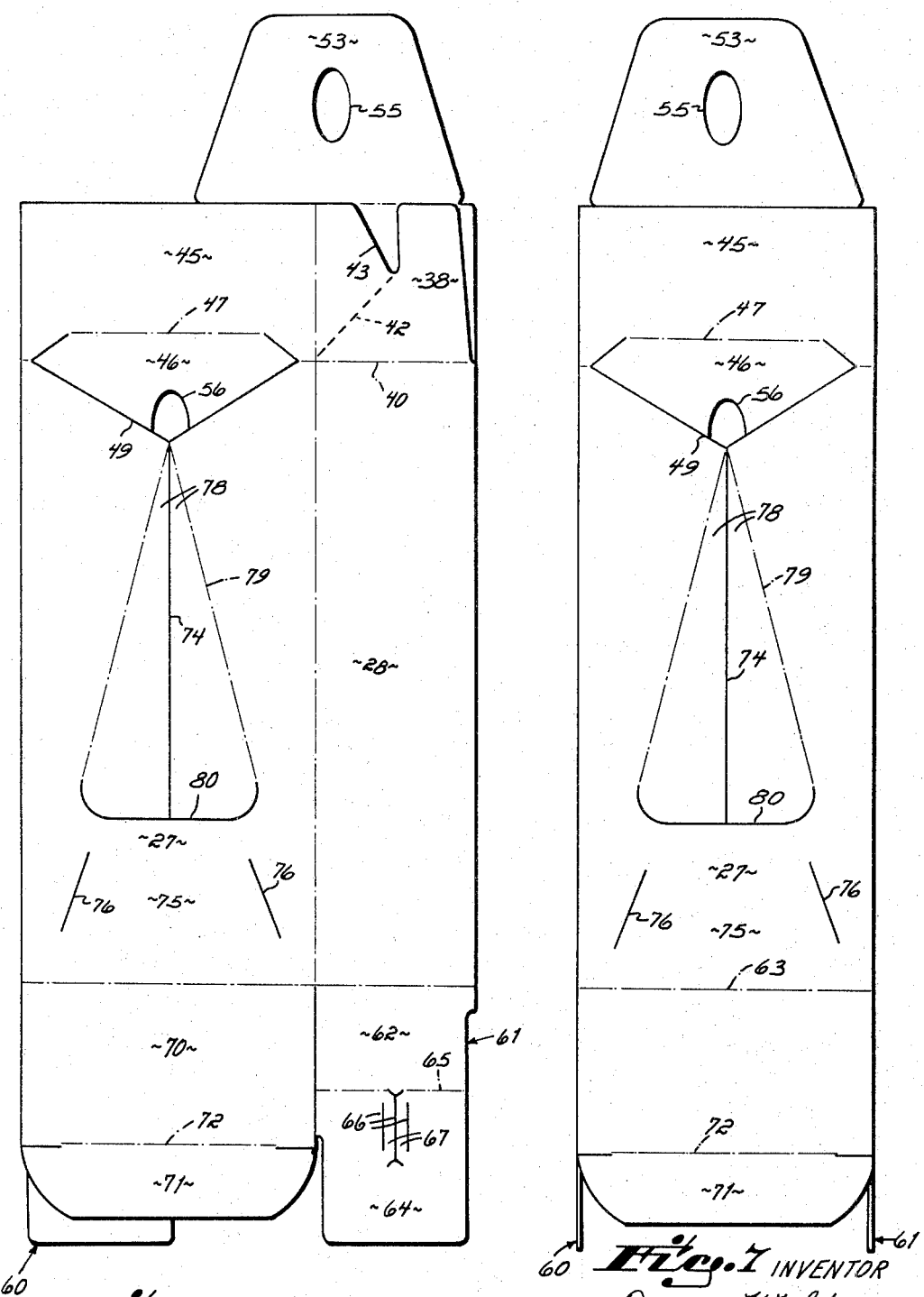

Filed July 6, 1966  7 Sheets-Sheet 4

INVENTOR
Orison W. Stone
BY
Wood, Herron and Evans
ATTORNEYS

April 16, 1968   O. W. STONE   3,378,137
DISPLAY CARTON
Filed July 6, 1966   7 Sheets-Sheet 5
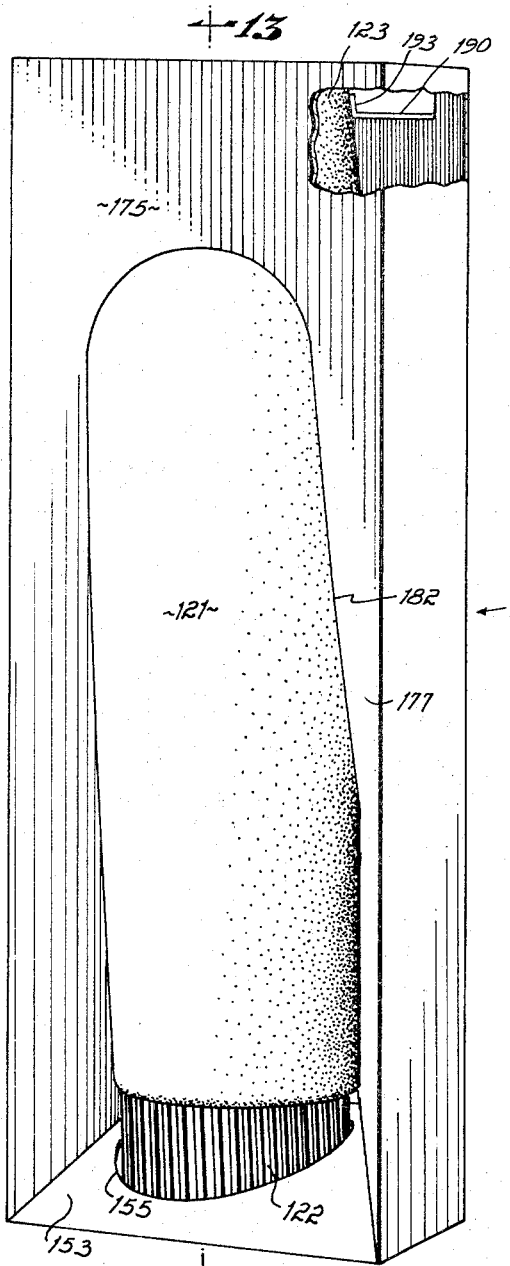
Fig. 12
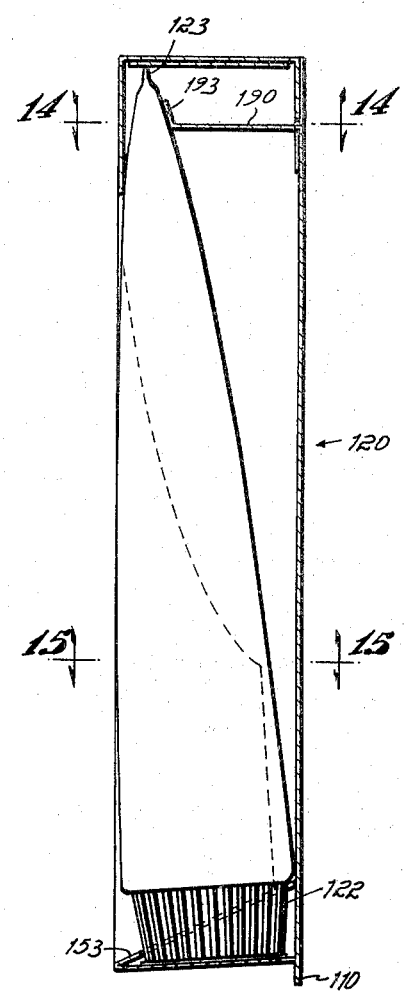
Fig. 13
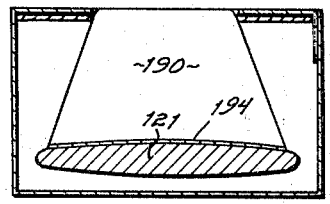
Fig. 15
Fig. 14
INVENTOR
Orison W. Stone
BY
Wood, Herron & Evans
ATTORNEYS

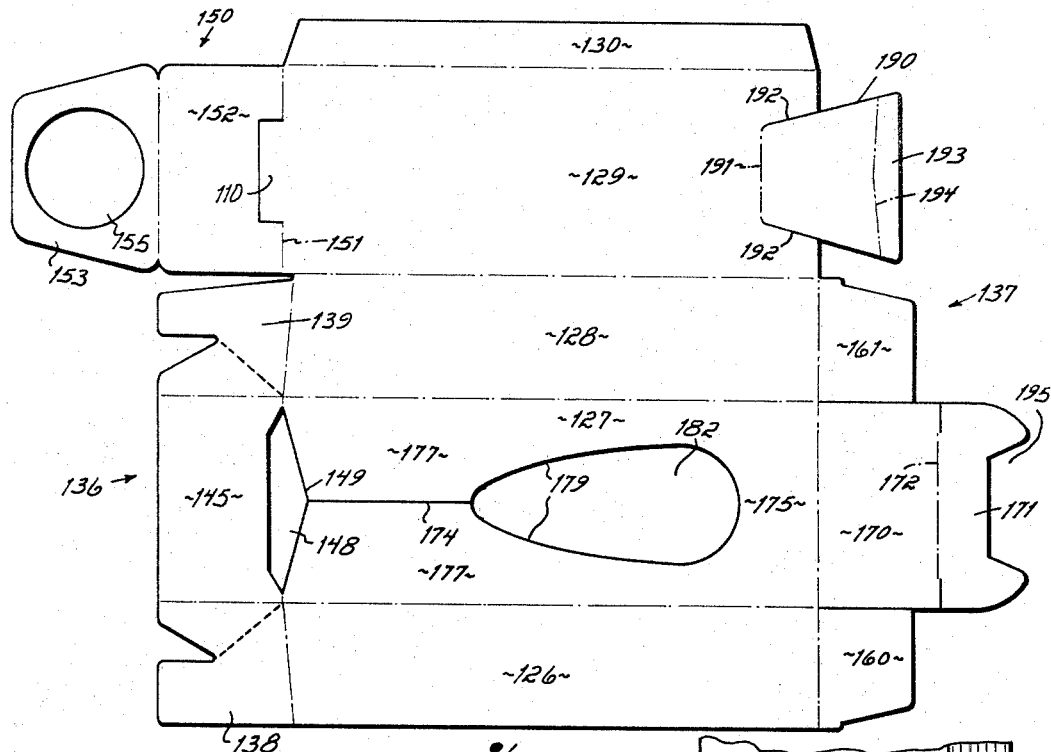
Fig.16
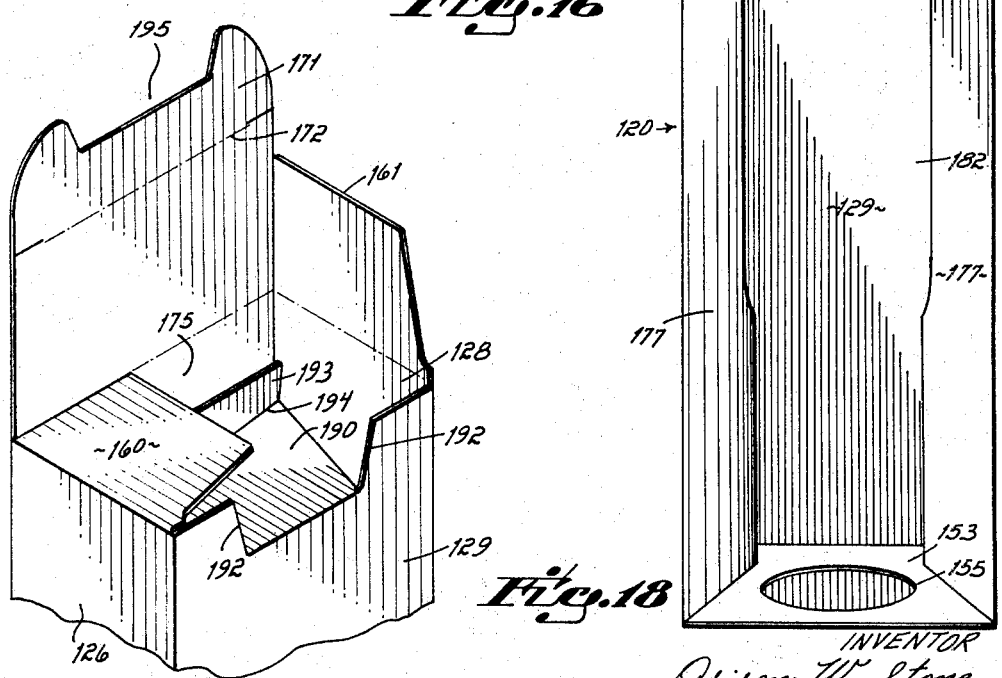
Fig.17
Fig.18

April 16, 1968  O. W. STONE  3,378,137
DISPLAY CARTON

Filed July 6, 1966  7 Sheets-Sheet 7

INVENTOR
Orison W. Stone
BY
Wood, Herron & Evans
ATTORNEYS

United States Patent Office
3,378,137
Patented Apr. 16, 1968

3,378,137
DISPLAY CARTON
Orison W. Stone, New York, N.Y., assignor to R. A. Jones and Company, Inc., Covington, Ky., a corporation of Kentucky
Filed July 6, 1966, Ser. No. 563,285
14 Claims. (Cl. 206—45.14)

ABSTRACT OF THE DISCLOSURE

A shadow box display carton having a front wall formed in part by shadow panels, the side walls of the carton being braced against spreading outwardly by a secondary flap which is connected to the side walls through gusset flaps, the secondary panel overlying the end of the carton and a primary flap having a first panel overlying the secondary flap and a tuck panel inserted into the carton. The disclosure is also directed to a shadow box construction having a sculptured face formed in part by the shadow panels extending from the plane of the front wall at one end of the carton curvolinearly into the opposite end of the carton.

This invention relates to a display carton for articles of merchandise and more particularly the invention relates to a shadow-box carton in which the article is visible through the front face of the carton, with the carton providing an attractive frame around the article as well as proper support for the article. The carton is particularly adapted for the display of cosmetics and therefore the attractiveness of the display is of particular importance.

A shadow-box display carton is not a new concept in the art of packaging. However, the display cartons of this type which are in common use today are subject to one or more of three principal deficiencies. The most important of these is that the display carton, while presenting the article for viewing, is not particularly attractive. Usually, the article simply lies in a shadow box which does nothing to enhance the attractiveness of the article being displayed. Further, the structure of the known carton is not particularly rugged, and as a consequence the cartons, after routine handling, tend to become dilapidated, and hence detract from the displayed article. Still further, many of the cartons are adapted to be loaded only through the front face of the carton and hence require hand loading or loading using complex machinery.

It has been an objective of the invention to provide a package for articles of merchandise in which the articles are more attractively displayed than has been possible heretofore, while at the same time providing a rugged carton structure whose appearance does not suffer from handling normally attending the packaging, transportation, and display of the article.

One of the important features of this invention resides in a provision of a sculptured front face of a carton which frames the article supported in the carton. The sculptured front face is particularly adapted for display of squeeze tubes in that it provides for maximum viewing of a tube while concealing the crimped end of the tube. More particularly, the front face is formed by a panel portion at the end of the carton which overlies the crimped end of the tube and marginal side portions embracing the sides of the tube while curving continuously into the carton until, at the opposite end of the tube, the marginal side portion lies substantially parallel to the side walls of the carton or at least at an acute angle to the side walls. Not only does this facial structure provide a sculptured frame for the supported article, but it also provides substantially complete concealment of the interior of the carton. Further, the engagement of the resilient marginal side portions with the article holds the article firmly in the carton.

In the carton described above, because the side portions extend into the carton, the front wall of the carton provides no support for the side walls at one end. This opened end of the carton is nevertheless ruggedly formed and braced to provide maximum support for the article along with secure interconnection with the side walls, thereby avoiding any tendency of the side walls to spread apart.

In accordance with this feature of the invention, the carton includes a secondary flap which acts as a lateral restraining strap across the open end of the carton, the secondary flap being secured to side flaps which are, in turn, hinged to the side walls of the carton. These side, or gusset flaps are creased to provide a bellows fold across the end of the carton and tie the secondary flap securely to the side walls, thereby preventing their spreading apart.

The invention further provides a primary flap having a first panel which overlies the secondary and gusset flaps and a second, or tuck panel which projects into the carton and engages the contained article. The natural resilience of the carton-forming material brings the tuck panel into engagement with the article and thus tends to hold it securely; however, to provide added insurance of the proper bracing of the article within the carton, a brace tab, hinged to the secondary flap and underlying the tuck tab of the primary flap, has been provided. The brace tab provides additional bias to urge the tuck tab into secure engagement with the article in the carton, and, cooperating with the article itself, locks the tuck panel in the carton.

It has been another objective of the invention to provide support for the crimped end of a squeeze tube within the carton. Two alternative structures are provided and are particularly suited for use with plastic and metallic tubes respectively. In the first of these, which is normally used with a plastic tube, an end flap is provided which engages the crimped end of the tube and forces it toward the front face of the carton. This, in turn, thrusts the article into snug engagement with the panel portion and marginal side portions of the front face, which enhances the sculptured relationship of the front face to the article and provides substantially complete concealment of the interior of the carton from view.

The alternative form is usually used with a metal tube whose surfaces must lie within the confines of the carton in order to avoid any inadvertent engagement with extraneous articles which might tend to dent the surface of the tube. Further, in the display of metallic tubes, it is particularly important to provide a support for the tube so that it will not in any way be creased or dented during handling. In accordance with the alternative form, provision is made for an end structure of the carton at the crimp end of the tube which engages the crimped end of the tube and suspends it centrally of the carton. This feature, cooperating with proper support at the other end of the tube, suspends the tube in a centered position in the carton where it is free from injury by engagement with other articles.

Cooperating with the metallic tube suspension feature described above, is a further feature of the invention which is concerned with the front face of the carton. In accordance with this feature of the invention, the marginal side portions have hinged to them, article-engaging flaps which underly and facially engage the article supported in the carton. The facial engagement is particularly important in supporting a metal tube, for edge engagement would tend to crease the metal tube and detract from its appearance. Further, since the metal tube is suspended centrally in the carton rather than being thrust into the opening in the front face, the facial-engaging flaps tend to conceal the interior of the carton from view.

The several features and objectives of the invention will become more readily apparent from the following detailed description taken in conjunction with the accompanying drawings, in which:

FIGURE 1 is a perspective view of a carton and an article of merchandise contained therein formed in accordance with the present invention, FIGURE 2 is a cross-sectional view taken along the lines 2—2 of FIGURE 1, FIGURE 3 is a cross-sectional view taken along lines 3—3 of FIGURE 2.

FIGURE 4 is a cross-sectional view taken along the lines 4—4 of FIGURE 2.

FIGURE 5 is a plan view of a carton forming blank.

FIGURES 6 and 7 are plans illustrating the steps of forming the carton of the present invention.

FIGURE 12 is a perspective view of an alternative form of carton.

FIGURE 13 is a cross-sectional view taken along lines 13—13 of FIGURE 12.

FIGURE 14 is a cross-sectional view taken along lines 14—14 of FIGURE 13.

FIGURE 15 is a cross-sectional view taken along lines 15—15 of FIGURE 13.

FIGURE 16 is a plan view of a carton blank from which the carton of FIGURE 12 is formed.

FIGURE 17 is a perspective view of an end structure for receiving the crimped end of a squeeze tube, and FIGURE 18 is a fragmentary plan view of the end of the carton opposite to that of FIGURE 17.

Figure 8:
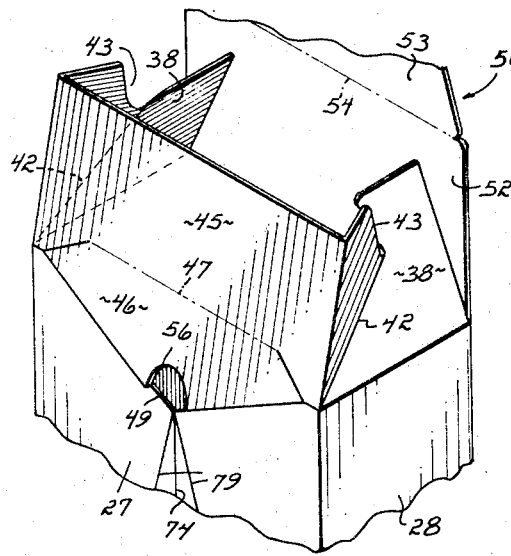
FIGURES 8 and 9 are perspective views of one end structure of the carton illustrating the steps of forming the structure.

A carton of the present invention is shown at 20 in FIGURE 1 and it contains a squeeze tube 21, having a cap 22 at one end and a crimped end 23 at the other end. The embodiment illustrated in FIGURE 1 is particularly well adapted for displaying a metallic squeeze tube, although it should be understood that its use is not necessarily restricted to a metallic tube. Further, the end structure shown at the cap end of the tube can be duplicated at the opposite end of the carton in order to adapt the carton for the display of articles other than tubes having crimped ends.

A carton is formed from a paperboard blank 25 illustrated in FIGURE 5. The blank includes, serially to each other, a side wall 26; a front wall or face, 27; a side wall 28; a back wall 29, and a glue flap 30. The side walls are hinged to the front wall along longitudinal creases 31 and 32. The back wall is hinged to the side wall 28 and the glue flap 30 along longitudinal creases 33 and 34 respectively. The blank has a cap end 36, and a closed end 37. At the cap end 36, flaps are provided for forming an end structure which closes the carton and provides means for engaging the cap end of an article. These flaps include side or gusset flaps 38 and 39, which are hinged to the side walls 26 and 28 respectively, along the creases 40 and 41. Each gusset flap has a diagonal crease 42, cooperating with a V-shape notch 43, which permits the gusset flap to take a bellows fold, as will be described below.

The gusset flaps 38 and 39 are also hinged along the creases 31 and 32 respectively, to a secondary flap 45. The secondary flap 45 derives substantially its entire support for connection to the carton, from its connection to the gusset flaps. Adjacent to the front wall 27, a brace tab 46 is hinged along a line 47 to the secondary flap. When the carton is erected, the brace tab is folded toward the secondary flap, leaving a slot 48 (FIGURE 9), between the front wall and the secondary flap. The slot is formed by the partial diamond-shape cut line 49, which defines the brace tab. The slot 48 may extend completely across the front face of the carton for the secondary flap is not required to be connected to the front wall.

A primary flap 50, is secured to the back wall along a crease 51. The primary flap includes a first panel 52, and a second, or tuck panel 53, which is hinged on a crease 54 to the first panel. The tuck panel, in illustrated embodiment, has a hole 55 into which a cap of an article projects to secure the article in the carton.

The invention is not necessarily restricted to the use of the hole 55, although the tuck panel should have some configuration adapting it for a snug engagement with the article which the carton is adapted to receive. The use of a hole in the tuck panel is preferred for a locking function described below. It will be noted that the brace tab 46 has a notch 56, which is adapted to align with a hole 55 when the tuck panel and line are juxtaposed as illustrated in FIGURES 1 and 2.

At the opposite, or closed end 37 of the carton, the carton closure is formed by two opposed side flaps 60 and 61, each having a first panel 62 hinged to the side walls 26 or 28 along a crease 63, and a support panel 64, hinged to the first panel along a crease 65. Each support panel has three slits 66, defining straps 67 which may be spread away from the support panel slightly to form a slot for frictional engagement with the crimped end of a squeeze tube. The closed end structure also includes an end panel 70 hinged to the front wall 27 along crease line 63, the end panel terminating in a tuck tab 71, which is hinged to the end panel along its crease 72. The end panel could be secured to the back wall 29, although it can be seen from FIGURE 5 that the illustrated layout admits of a nesting of the carton blanks end to end, thereby minimizing any waste of the material from which the blanks are cut.

The front wall or face 27 of the carton is formed at the closed end by a panel portion 75 which normally resides within the plane of the front face of the carton. The panel portion may, in certain applications, have stress relieving scores 76 formed in its surface to avoid the tearing of the panel portion.

Figure 11:
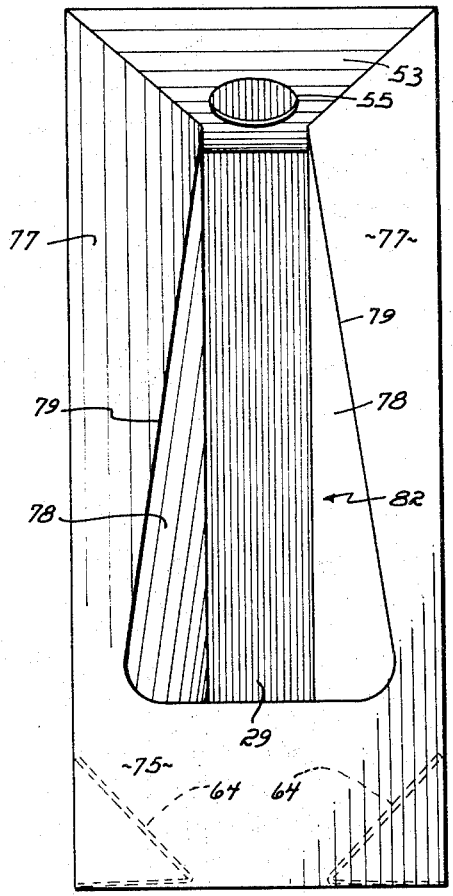
FIGURE 11 is a plan view of a fully formed carton.
Figure 10:
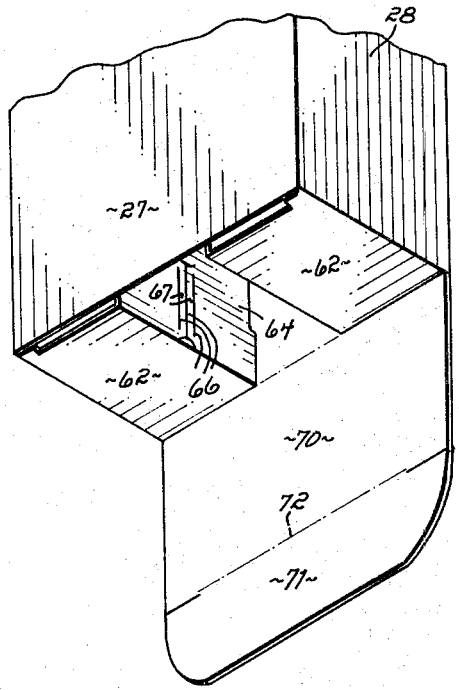
FIGURE 10 is a perspective view of an opposite end structure from that shown in FIGURES 8 and 9.

Extending toward the cap end from the panel portion are marginal side portions 77 which form shadow panels which terminate in the cut edge 49 which forms the brace tab 46. The marginal side portions 77 are defined in part by a longitudinally extending central slit 74 which intersects the slot 48 formed in the cut edge 49. Longitudinally extending flaps 78 are hinged to the marginal side portions along score lines 79. The flaps 78 are separated from the panel portion 75 by a U-shaped cut line 80. The score lines 79 and the cut line 80 define a generally triangular central opening 82 (FIGURE 11) into which the article of merchandise is disposed.

In forming the carton a box manufacturer normally adhesively secures the glue flap 30 to the side wall 26 and folds the carton flap as illustrated in FIGURE 6.

At the packaging installation, the carton is first erected to a generally rectangular configuration as illustrated in FIGURE 7. Turning to FIGURE 8, the cap end structure of the carton is formed by first pressing the gusset flaps 38, 39 inwardly to fold the gusset flaps upon themselves along the crease lines 42 and to fold the secondary flap 45 across the cap end 36 of the carton.

Figure 9:
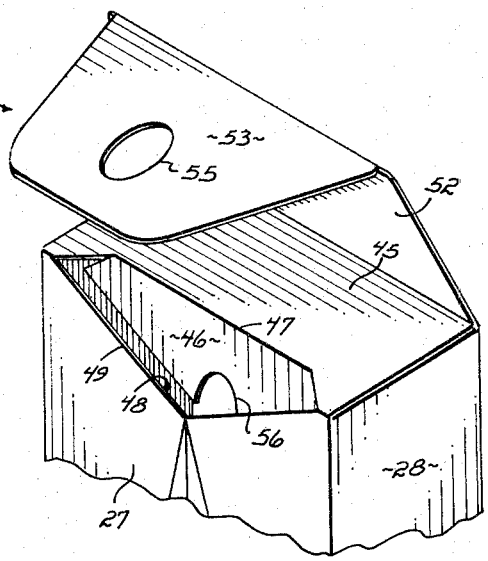

As illustrated in FIGURE 9, the brace tab 46 is folded inwardly along its crease 47 and the primary flap 50 is folded across the secondary flap along the crease 51 while simultaneously inserting the tuck panel 53 into the slot 48 adjacent the brace tab 46. The carton is then in condition to receive an article through the opposite end of the carton through the use of automatic machinery.

When the article 21 is inserted into the carton, the marginal side portions 77 of the front wall 27 are depressed at the cap end of the carton and the article overlies them. Longitudinally extending flaps 78 provide a facial engagement of the carton with the article along the length of the article. This facial engagement of the article prevents a creasing of the metallic tube and provides substantially complete concealment of the interior of the carton from view.

When the article is in place with the cap 22 projecting through the hole 55 and notch 56 of the tuck tab and brace tabs respectively, the resilience of the paperboard from which the carton is made urges the tuck tab 53 into engagement with the cut edges 49 of the marginal side portions of the front wall thereby forming a neat mitered corner. The brace tab 46 provides an additional biasing force tending to hold the tuck tab into engagement with that cut edge 49.

The cap 22 of the article cooperates with the tuck panel 53, its hole 55 and the brace tab 46 to provide a lock for the tuck panel. The brace tab being secured to the secondary flap 45 is blocked against outward movement. The cap 22 bears against the brace tab and thus the cap and the article upon which it is placed is braced against outward displacement. Since the cap 22 projects through the hole 55 in the tuck tab, the mating engagement of the tuck tab with the cap 22 blocks outward displacement of the tuck tab.

With the article in place, it can be seen from FIGURE 1 that the front face of the carton presents the panel portion lying substantially in the plane of the front face with the marginal side portions curving continuously or uninterruptedly down into the carton alongside of the article 21, thereby presenting a sculptured frame surrounding the article.

When the article is in place, its crimped end 23 is suspended by folding the side flaps 60 and 61 of the closed end inwardly so that their first panels 62 lie across the end of the carton and their support panels project into the carton at acute angles to the first panels. The crimped end of the article presents corners 85 which project between and are frictionally held by the straps 67 of each support panel to provide a suspension of the article within the carton. The opposite or cap end of the article is also suspended by its engagement with the hole 55 of the tuck tab. As shown in FIGURE 2, the article 21 lies well within the confines of the carton thereby avoiding any damage to it through inadvertent engagement of extraneous articles.

While the invention has been described in relation to an end loading operation, it should be understood that the carton may be loaded after the carton is fully erected by first inserting the crimped end of the article into the carton and thereafter pressing the capped end of the article 21 against tuck panel 53 until the cap 22 snaps into the hole 55. It should be further understood that the carton can be formed at both ends by a cap end structure described above and the carton would be loaded with a generally cylinder article for example simply by laying it into the carton through the front face.

It should also be understood that the form of the invention described above is not necessarily restricted to the particular form of closed end structure by which the squeeze tube is suspended centrally of the carton. Rather, the end structure to be described in the alternative embodiment can be substituted although that end structure is better suited for application to plastic tubes which cannot be damaged by engagement with other articles.

*Alternative carton structure*

In the alternative embodiment, a 100 series of numbers will be used with the last two digits corresponding to similar parts in the first described embodiment.

The carton 120 which is shown in perspective in FIGURE 12 receives an article 121 which, in the illustrated form of the invention, is a plastic squeeze tube having a cap 122 and a crimped end 123. The carton structure is such that the crimped end of the carton is forced toward the front wall and the longitudinally extending flaps of the first embodiment eliminated from the marginal side portions 177. The combination of the two distinguishing structural features causes the article 121 to project slightly through the central opening 182 substantially flush with the plane of the front face of the carton. The article 121 snugly engages the edges 179 of the marginal side portions thereby providing substantially complete concealment of the interior of the carton from view.

The carton is formed from the blank illustrated in FIGURE 16. The blank includes side walls 126 and 128 which interconnect a front wall 127 with a black wall 129. A glue flap 130 is hinged to the back wall 129.

At the cap end 136 of the carton the structure is generally the same as that described in the first embodiment and includes gusset flaps 138 and 139 hinged to and supporting a secondary flap 145. A primary flap 150 has a first panel 152 adapted to overlie the end of the carton and a tuck panel 153 having an article receiving hole 155 which is adapted to project into a slot 148 formed between the secondary flap 145 and the front wall 127. The primary flap has a support leg 110 struck from the first panel 152 at the hinge line 151. In this embodiment of the invention the brace tab has been eliminated, although it is of course possible to manufacture this form of the invention with a brace tab if desired.

The opposite or closed end 137 includes single panel side flap 160 and 161 and an end panel 170 having a tuck tab 171 hinged to it along a line 172.

A feature of the present embodiment which distinguishes it from the earlier embodiment is a clamping flap 190 hinged on a crease 191 to the back panel 129. The clamping flap is partially cut from the back panel along lines 192. A tab 193 is hinged along the line 194 to the clamping flap, the tab 193 adapted to provide facial engagement with the crimped end 123 of a squeeze tube.

The tuck tab 171 has a notch 195 which is adapted to receive the clamping flap 190 when the carton is erect and tends to hold the clamping flap in the proper relationship to the crimped end of the article within the carton.

The front wall or face of the carton is formed similarly to that of the first embodiment. It includes a panel portion 175 at the closed end of the carton and marginal side portions 177 extending longitudinally from the panel portion 175 toward the cap end 136. The marginal side portions are defined in part by a longitudinally extending center slit 174, which is terminated at one end by a cut line 149, and at the other end by the opening 182 into which the article is inserted.

In the use of the carton of the present embodiment, the end structure at the cap end 136 is formed as described in connection with the first embodiment. The carton is then preferably end loaded with the cap of the squeeze tube projecting into the opening 155 of the tuck panel 153. When the primary flap is positioned across the end of the carton, the leg 110 projects from the end of the carton permitting it to be secure while standing on its end.

After the article is inserted, the clamping flap 190 is swung on its hinged line 191 until the clamping flap lies across the end of the carton. The tab 193 moves into facial engagement with the crimped end of the squeeze tube as illustrated in FIGURE 13. The side flaps 160 and 161 are then swung across the end of the carton and the flap 170 is swung over the end of the carton to overlie the side flaps 160 and 161 with the tuck tab 171 projecting into the carton. When the tuck tab projects into the carton, the clamping flap 190 is received in the notch 195 and provides an interlocking engagement tending to hold the clamping flap in the transverse alignment illustrated in FIGURE 14 which forces the article 121 toward the front face of the carton.

It can be noted by referring to FIGURES 14 and 16 that the clamping flap has a slightly V-shaped hinge line 194 which conforms to the contour of the article 121.

When the carton is formed, the front face of the carton is characterized by the panel portion 175 lying substantially in the plane of the front face of the carton and the marginal side portions 177 curving into the carton until they lie substantially adjacent the side walls at the cap end of the carton. The sculptured front face of the carton cooperating with the thrusting of the article 121 through the front opening provides an attractvie frame surrounding the article.

*Alternative form of cap end structure*

Figure 19:
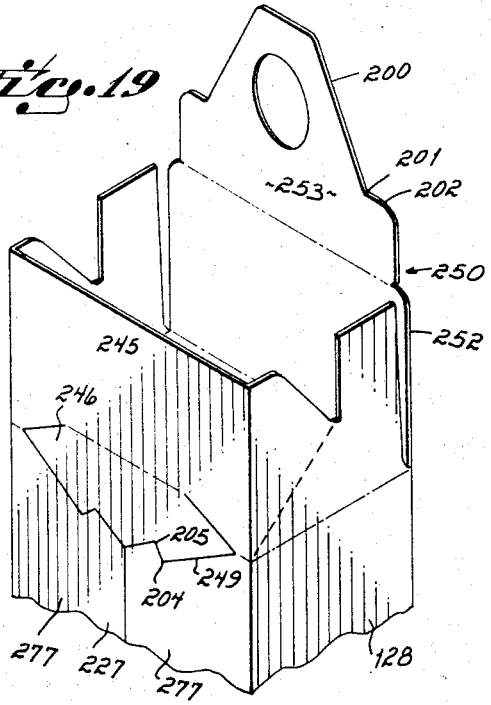
FIGURES 19, 20 and 21 are fragmentary perspective views of an alternative locking form of carton end structure.
Figure 21:
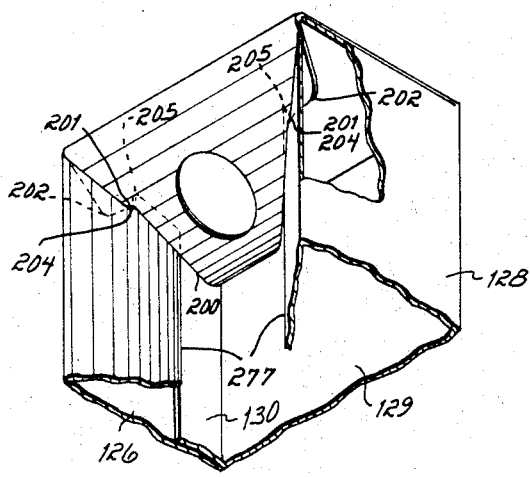

The cap end structure of FIGURES 19 and 21 is distinguishable from the cap end structure of the first embodiment by an interlocking relationship of the tuck tab with the marginal side portions of the front wall. This structure is particularly desirable for off-machine loading in that it permits the cap end structure to be fully formed and maintained in that condition until the article is inserted into it.

As shown in FIGURE 19, the carton has a primary flap 250, including a first panel 252 hinged to the back wall of the carton, and a second, or tuck panel 253 hinged to the first panel. The tuck panel has a free edge 200 having a V-shape notch 201 which provides a shoulder 202. The tuck tab, as in the previous embodiment, is adapted to project into a slot 248 (FIGURE 20) between the front wall 227 and the secondary flap 245. The slot 248 is formed in part by cut edge 249, which has a V-shape notch 204, forming a shoulder 205.

Figure 20:
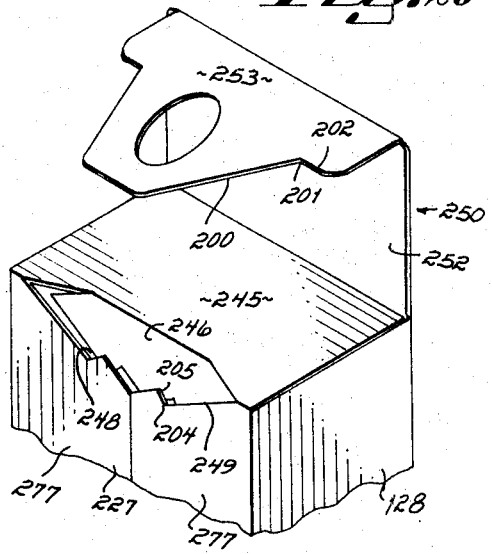

In forming the end structure, the secondary flaps, along with its gusset flaps, are folded across the end of the carton as shown in FIGURE 20. The brace tab 246 is forced inwardly a few degrees to break it away from the edge 249, from which the tab is cut. The tuck tab is inserted into the carton and the marginal side portions 277 of the front wall are pressed inwardly until the shoulders 202 of the tuck tab snap under the cut edge 249 on each marginal side portion 277.

The completed structure is shown in FIGURE 21, and there it can be seen that the shoulders 202 of the tuck tabs underlie the marginal side portions 277 and the shoulders 205 on the marginal side portions underlying the tuck tab 253 with the V-shape notches 201 and 204 interengaged. This interengagement locks the tuck tab and marginal side portions together, and forms a neat, mitered corner.

*Second alternative form of cap end structure*

Figure 22:
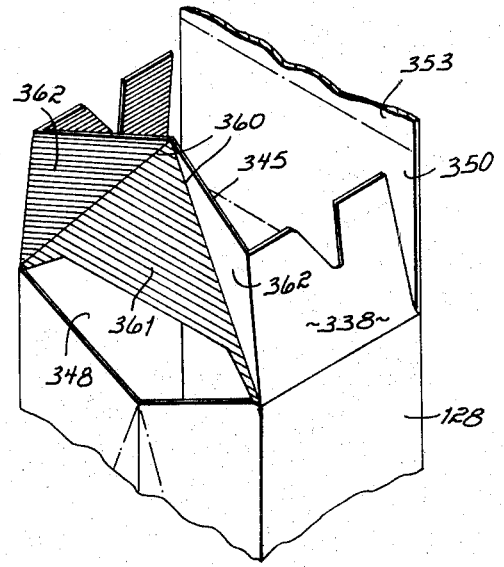
FIGURE 22 is a fragmentary perspective view of a second alternative form of the invention.

The cap end structure of FIG. 22 illustrates another structure providing a secondary flap which overlies the end of the carton without being secured to the front face. In the previous embodiments, the side flaps have been creased diagonally to permit the secondary flap to be folded across the end of the carton while remaining attached to the side flaps. In the embodiment of FIG. 22, the side flaps remain uncreased whereas the secondary flap is creased to permit a similar folding operation.

More specifically, the carton structure of FIG. 22 includes side walls 128 to which side flaps 338 are hinged. A secondary flap 345 is hinged at its lateral edges to the side flaps and has diagonal crease lines 360 dividing the secondary flap into a generally triangular center panel 361 and triangular lateral panels 362 which form gusset flaps. A slot 348 is formed between the secondary flap and the front wall of the carton to receive the tuck tab 353 on the primary flap 350.

In forming the end structure, the center panel 361 is pressed inwardly causing the lateral panels 362 to fold along their crease lines 360. The lateral panels fold under the side flaps 338 and over the center panel 361 to square off the end structure as in the embodiments earlier described.

Functionally, the structure of FIG. 22 is the same in all material respects as that described in the earlier embodiments insofar as it provides an end structure which presents a slot to receive the tuck tab of the primary flap while at the same time providing resistance against outward spreading of the side walls when the carton is formed.

I claim:
1. In a carton having an open front wall, a back wall, and two side walls, said front wall having marginal side portions terminating in free edges at one end of said carton, an end structure for said one end of said carton comprising
   a primary flap having a first panel hinged to said back wall and a second panel hinged to said first panel,
   gusset flaps hinged to said side walls and being diagonally creased,
   a secondary flap hinged only at its sides to said gusset flaps and extending across the front of said carton, said gusset flaps cooperating with said secondary flap to provide a bellows fold at the end of said carton,
   said secondary flap being folded across the end of said carton with said gusset flaps folded upon themselves thereby bracing said side walls against spreading outwardly,
   said primary flap having its first panel folded across the end of said carton overlying said secondary flap, and said second panel being tucked into said carton between said secondary flap and said free edges of said marginal side portions.

2. A carton according to claim 1 in which said second panel has means for receiving an article to be supported within said carton.

3. A carton according to claim 1 further comprising a brace tab struck from said front wall and hinged to the edge of said secondary panel, said brace tab adapted to extend into said carton adjacent said second panel to urge said second panel into engagement with an article within said carton.

4. A carton according to claim 2 further comprising, means forming an end structure at the opposite end of said carton for supporting the crimped end of a tube whereby said tube may be suspended between the opposite ends of said carton.

5. A carton according to claim 1 in which said front wall includes
   a panel portion adjacent the end of said carton opposite said end structure and residing in the plane of the front wall of the carton,
   said marginal side portions extending integrally and continuously from the panel portion toward the opposite end of the carton and curvilinearly departing respectively from the plane of the front wall into positions residing adjacent the planes of said side walls.

6. In a carton having a back wall, end closures, and side walls, a carton front wall structure comprising
   a panel portion adjacent one end of the carton and residing in the plane of the carton face,
   marginal side portions extending integrally and continuously from the panel portion toward the opposite end of said carton and curvilinearly departing from the plane of the face of the carton into positions residing adjacent said side walls,
   said marginal side portions and said panel portion defining an opening in said front face to receive an elongated article with one end underlying said panel portion and with a substantial portion of said article engaging said marginal side portions to maintain said curvilinear relationship, a primary flap hinged to said back wall at the end of said carton opposite said panel portion, said primary flap having a first panel overlying said opposite end of said carton and a second panel tucked into the carton and engaging the free ends of said marginal side portions and forming mitered corners with said marginal side portions.

7. A carton according to claim 6 further comprising longitudinally extending flaps hinged to said marginal side portions to provide facial engagement with an article disposed in said carton.

8. A carton according to claim 6 in which said article is a squeeze tube having a crimped end underlying said panel portion, said carton further comprising
an end structure adjacent said panel portion including a flap hinged to said back wall and engageable with said crimped end to force said tube into snug engagement with said panel portion.

9. A carton according to claim 6 in which said marginal side portions define a central generally triangular opening in said face, said side portions being separated by a slit at the end remote from said panel portion to provide portions for resilient facial engagement with an article in said carton.

10. A carton according to claim 6 in which said panel portion has stress relieving scores extending diagonally from the corners of said carton.

11. An interlocking end structure for a carton having front, back and side walls and an article contained within said carton, said structure comprising
a secondary flap across the end of said carton and secured to said side walls, said secondary flap being separated from said front wall by a slot,
a brace tab hinged to said secondary flap and projecting into said carton adjacent said front wall
a primary flap hinged to said back wall, said primary flap having a first panel overlying said secondary flap and a tuck panel projecting into said carton and overlying said brace tab, said tuck panel having an aperture,
an article disposed in said carton and having an end projecting into said aperture of said tuck panel, said projecting end residing under said brace tab to lock said tuck panel in said overlying position, 12. In a carton having an open front wall, a back wall, and two side walls, said front wall having marginal side portions terminating in free edges at one end of said carton, an end structure for said one end of said carton comprising
side flaps hinged to said side walls,
gusset flaps hinged to said side flaps,
a secondary flap hinged at its lateral edges to said gusset flaps, the carton having a slot between said secondary flap and the free edges of said marginal side portions,
creases associated with said secondary, gusset and side flaps to permit said flaps to be folded across the end of said carton thereby bracing said side walls from spreading outwardly,
and a primary flap hinged to said back wall and overlying said secondary, gusset and side flaps with an end portion of said primary flap tucked into said slot.

13. A carton according to claim 12 in which said secondary flap has two creases intersecting at its free edge to delineate a generally triangular center panel and generally triangular lateral panels which form said gusset flaps.

14. In a carton having a back wall, end walls, and side walls, a carton front wall structure comprising
a panel portion adjacent one end of the carton and residing in the plane of the carton face,
marginal side portions extending integrally and continuously from the panel portion toward the opposite end of said carton and curvilinearly departing from the plane of the face of the carton into positions residing adjacent said side walls,
said marginal side portions and said panel portion defining an opening in said front face to receive an elongated article with one end underlying said panel portion and with a substantial portion of said article engaging said marginal side portions to maintain said curvilinear relationship, and
means forming a mitered corner structure with said marginal side portions at the end of said carton opposite said panel portion, said means including panel means connected to the adjacent end wall and projecting into said carton to form mitered corners with the ends of said marginal side portions, said panel means also providing an opening to receive and retain the end of an article disposed in said carton.

References Cited

UNITED STATES PATENTS

| | | | |
|---|---|---|---|
| 291,281 | 1/1884 | Blakely | 229—38 |
| 309,052 | 12/1884 | Hohenstein | 229—38 |
| 2,132,957 | 10/1938 | Mahone | 229—28 |
| 2,492,712 | 12/1949 | Ringler | 229—39 |
| 2,946,433 | 7/1960 | Hennessey | 206—45.19 |
| 3,036,754 | 5/1962 | Kleingers | 229—39 |
| 3,093,290 | 6/1963 | Banks et al. | 229—34 |
| 3,270,867 | 9/1966 | Hennessey et al. | 206—45.14 |
| 3,330,465 | 7/1967 | Davidson et al. | 206—45.14 |

FOREIGN PATENTS 1,004,654  9/1965  Great Britain.

WILLIAM T. DIXSON, JR., *Primary Examiner.*